United States Patent [19]

Taylor et al.

[11] Patent Number: 4,961,722

[45] Date of Patent: Oct. 9, 1990

[54] CONICAL SCREEN FOR A VERTICAL CENTRIFUGAL SEPARATOR

[75] Inventors: Jimmy Taylor, Mt. Gay, W. Va.; David L. Singleton, Poland, Ohio; Stanley A. Skeens, Danville; Dennis R. Runyon, Logan, both of W. Va.

[73] Assignee: Guyan Machinery Co., Phico, W. Va.

[21] Appl. No.: 443,280

[22] Filed: Nov. 30, 1989

[51] Int. Cl.$^5$ .................... B01D 35/00; B04B 7/16
[52] U.S. Cl. ..................... 494/36; 210/369; 210/374; 210/380.1; 494/43; 494/64; 494/66
[58] Field of Search .......... 494/36, 43, 45, 60, 494/64, 66, 67; 210/369, 374, 377, 380.1, 360.1, 499, 210, 212

[56] References Cited

U.S. PATENT DOCUMENTS

| | | | |
|---|---|---|---|
| 618,814 | 1/1899 | Darby | 210/377 |
| 1,103,970 | 7/1914 | Kemp | |
| 1,190,842 | 7/1916 | Atkins et al. | |
| 1,342,743 | 6/1920 | Elmore | 210/377 |
| 1,961,226 | 6/1934 | Keatley et al. | 210/369 |
| 2,370,353 | 2/1945 | Howe | 494/36 |
| 2,727,631 | 12/1955 | Pate | 210/369 |
| 3,108,067 | 10/1963 | Dietzel et al. | 494/36 |
| 3,199,681 | 8/1965 | Kirkpatrick | 494/66 |
| 3,207,627 | 9/1965 | Dietzel et al. | 210/210 |
| 3,438,501 | 4/1969 | Oyen | 210/374 |
| 3,630,379 | 12/1971 | Sharples | 210/369 |
| 3,799,353 | 3/1974 | Pause | 210/369 |
| 4,000,074 | 12/1976 | Evans | 210/369 |
| 4,052,304 | 10/1977 | Vertenstein | 494/36 |
| 4,135,659 | 1/1979 | Derton et al. | 233/3 |
| 4,405,454 | 9/1983 | Hultsch et al. | 210/369 |
| 4,487,695 | 12/1984 | Connolly | 210/380.1 |
| 4,718,945 | 1/1988 | Schaper et al. | 494/36 |
| 4,846,781 | 7/1989 | Knelson | 494/43 |

FOREIGN PATENT DOCUMENTS 1554412 10/1979 United Kingdom ........ 494/36

OTHER PUBLICATIONS

Coal Preparation, Leonard et al., 1968, pp. 12-14-1-2-21.
VOR-SIV It's Simple, Cross, Jan. 1986.

Primary Examiner—Timothy F. Simone
Attorney, Agent, or Firm—Sutherland, Asbill & Brennan

[57] ABSTRACT

A vertical centrifugal separator, for example of the type used to dry coal, is improved by splitting the frustoconical screen into two pieces and including access doors in the water shield surrounding the screen. The division of the screen is made horizontally, for example at a level of about 30 to 70 percent down from the top of the screen. This permits the separator to be serviced in a relatively short time, by replacing only the upper partial screen when holes are worn in it. This is feasible because most of the wear in these screens is confined to about the upper 30 percent of their height. If a screen support basket is used, it can be confine to the lower partial screen, so that it does not have to be removed in order to replace the upper partial screen.

29 Claims, 4 Drawing Sheets

CONICAL SCREEN FOR A VERTICAL CENTRIFUGAL SEPARATOR

This invention relates to vertical centrifugal separators of the type used to dry coal.

Vertical centrifugal separators, for example of the type disclosed in U.S. Pat. No. 2,370,353 to Howe, are commonly used to dewater coal at a coal washing plant. A slurry of coal in water, together with sand, shale, and other fine particles, is poured into the top of the separator. The larger pieces of coal (e.g., up to about one-quarter inch in diameter) are separated from the water and waste material, and the clean coal is released in a substantially dry state. The slurry charged to the separator typically will contain about 20 to 35 weight percent water. The clean coal usually will have a moisture content below about 10 percent, and preferably as low as about 4 percent or less. These figures refer to surface water only, not internal moisture, which is sometimes called "inherent moisture." The internal moisture content of coal can range from as low as about one percent to as high as about 10 percent.

Another common use for vertical centrifugal separators is to separate water from rock refuse. The clarified water typically is recycled, and the separated refuse is disposed of, for example in a landfill.

A vertical centrifugal separator is comprised of a vertical drive shaft assembly, a frustoconical flight assembly coaxially carried by the drive shaft assembly, and a larger frustoconical screen, also carried by the drive shaft assembly, which concentrically surrounds the flight assembly. The drive shaft assembly, flight assembly, and screen are enclosed in a housing, sometimes called a "water shield." The apparatus is oriented so that the bases of the cones are down and the tops, or apexes, are up.

The flight assembly consists essentially of a hollow frustrum of a right circular cone that has a plurality of parallel, spiral, hindrance flights attached to the exterior of its lateral wall. The cone typically has a slope angle (meaning the angle between the lateral wall and the axis of the cone) of about 30 degrees. Usually there are six to ten flights on the cone. The flights are mounted on the cone at substantially equal distances from one another. Each flight protrudes perpendicularly from the cone wall and spirals like a ribbon part way around the cone, descending from the apex of the cone to the base.

In all of the prior art flight assemblies of which we are aware, the angle of spiral for each mounted flight has been approximately 30 degrees. By "angle of spiral" is meant the acute angle formed by the intersection of the plane of the flight with a vertical plane. By "vertical plane" is meant a plane passing through the axis of the cone. Accordingly, the greater the angle of spiral, the longer the flight must be to reach from the apex of the cone to the base.

The angle of spiral is substantially uniform throughout the length of the flight in all of the flight assemblies of which we are aware. Thus, the flights are not wavy, scoop-shaped, or convex; rather, they descend in a straight line from the apex of the cone to the base.

The screen is mounted in the separator so as to surround the conical flight assembly, with just a slight gap between the outside edges of the flights and the inner surface of the screen, e.g., about 1/32 of an inch. Both the flight assembly and the screen are rotated at high speeds in the same direction by the drive shaft assembly to which they are attached. The direction of rotation is the same direction as the downward slope of the flights. The screen may be surrounded by a concentric, rigid basket to provide support for the screen and keep it from going out-of-round as it is spun. The drive shaft assembly is so designed as to spin the screen at a slightly faster speed than the flight assembly. This typically is accomplished by use of an inner drive shaft that spins the flight assembly, and a hollow, outer drive shaft, surrounding the inner shaft, which spins the screen. For example, the flight assembly might rotate at a speed of, say, 658 rpm, while the screen rotates at a speed of about 667 rpm. Thus, while both are rotating at high speeds, the screen slowly and steadily moves past the flights. If a basket is used, it is mounted so as to rotate in unison with the screen.

While the flight assembly and screen are spinning, the coal slurry is charged from above into the annular space between the flight assembly and the screen. The flights help pull the slurry around the annular space, imparting centrifugal force to it. The coal slowly moves down the spiral flights while it is pressed against the inside of the screen by the centrifugal force. The further down the screen, the greater is the centrifugal force. At the bottom of the flights, the clean, dry coal falls onto collection means, for example a moving conveyor belt. The water, hurled out by centrifugal force, flies radially through the screen, hits and runs down the inside wall of the housing, and is collected in an effluent chamber below. Sand, coal dust, and other debris small enough to pass through the openings in the screen are hurled out with the water. A typical size screen opening is about one-half millimeter, in the shortest diameter.

The slow, steady movement of the screen past the flights helps the large pieces of coal tumble down the flights, and also helps dislodge any pieces of coal that temporarily lodge in the openings in the screen. If a piece of coal seated in a screen opening is too large to pass under the flights, it is swept loose as the screen advances past the next flight.

Because of the abrasive nature of the solids being separated and the high centrifugal forces involved, the screens in vertical centrifugal separators are subjected to substantial wear. Holes form in the screen, causing the loss of some coal with the smaller particle waste solids. Screen condition can be monitored during operation of the separator by checking the solids content of the dirty water collected in the effluent chamber. As new and larger holes are worn in the screen, more solids pass through with the water. When too much coal is being lost in the effluent, the separator is temporarily taken out of service and the worn screen is replaced with a new or rebuilt one.

Flights on the conical flight assemblies wear out also, but screens usually wear out faster and need to be replaced more often. Thus, for example, in coal dewatering operations using the centrifugal dryers of the prior art, the flights typically must be replaced after approximately 1,000 to 1,200 hours of use, and the screen typically has to be replaced after only 400 to 500 hours of use.

Prior to the present invention, all commercially available vertical centrifugal separators of which we are aware required that the housing be removed in order to replace the screen. We have observed, however, that most of the screen wear occurs in the upper region of the screen, e.g., within about the top 30 to 40 percent of the height of the screen. The present invention takes advantage of this fact and provides a novel separator in which adequate screen replacement can be accomplished without removal of the housing and, therefore, in a fraction of the time required with the prior art separators. This results in considerable savings, not only in labor, but in screen expense as well.

In the present invention the screen is divided horizontally into an upper partial screen and a lower partial screen. Preferably the upper section will constitute about 30 to 70 percent of the overall height of the screen. The two partial screens are detachably held together in the separator, and the housing has an access door through which the upper partial screen can be detached from the lower partial screen and the drive shaft assembly, be removed from the housing, and be replaced with a new screen without ever having to remove the housing or the lower partial screen.

The screens in vertical centrifugal separators can be made in a variety of styles and designs. So far as we are aware, those most commonly used are a parallel rod design (e.g., as shown in U.S. Pat. No. 4,487,695 to Connolly) and a perforated metal design. The latter often is used in refuse dryers. For some applications it may be desirable to use a different screen pattern in the upper partial screen than in the lower partial screen in the separator of the present invention. Usually the screen is made of stainless steel.

To provide support for the screen and to prevent it from going out-of-round, a concentric frustoconical support basket normally is placed atop the screen. The basket typically is comprised of one or more rigid, horizontal hoops that fit snugly around the screen, bracing it and preventing it from bowing out. Alternatively, the hoops can be welded to the screen, and the basket can comprise a series of vertical struts that encircle the hoop and fit snugly against it. As mentioned, the basket is secured in the separator so as to rotate in unison with the screen.

There are two different types of support basket that can be used in the separator of the present invention. Either a full-height support basket that, like the screen, is horizontally divided into detachable upper and lower partial baskets, can be used, or, in some circumstances, a half-height support basket, which surrounds only the lower partial screen, can be used. We have found that the upper partial screen, if it has sufficient thickness, often will not need a support basket to keep it inround, i.e., to prevent it from bowing out when spun. In that case use of a half-height basket will do. This arrangement has the advantage that it allows the upper partial screen to be removed from the housing without having to also remove any part of the support basket. This also is a labor-saving feature. It affords substantial savings in the cost of materials as well, since only a half-basket is required.

When, in the separator of the present invention, only the lower partial screen is backed by a support basket, it is preferred that the upper partial screen have an external horizontal flange, at or near its base, that sits on a corresponding external flange of the half-height support basket. The latter flange is located at or near the top of the basket. Means are included for holding the two flanges together. Thus, for example, the flanges can be bolted together, so that the upper and lower partial screens abut one another. This means of securing the upper partial screen in the separator has the advantage that it facilitates the establishment of a substantially unitary screening surface—i.e., substantially uninterrupted by steps—that extends from about the top of the upper partial screen to about the base of the lower partial screen.

In the typical centrifugal dryer, the vertical drive shaft assembly has an inner drive shaft surrounded by a shorter concentric outer drive shaft. The rotational speeds of the two shafts may be independently set. The conical flight assembly is attached to the inner shaft at its upper end. The screen and support basket are mounted on the rim of a spoked, horizontal wheel, called a "rotor," which is fastened to the outer drive shaft. Coal that falls out the bottom of the annular space separating the flight assembly cone and the screen falls through the wheel (passing between the spokes) onto the conveyor belt. In the present invention it is preferred that the lower partial screen have an external horizontal flange at or near its base. The support basket preferably also has an external horizontal flange at or near its base. The lower screen flange, the support basket lower flange, and the rim of the rotor preferably are fastened together.

The screen access door in the separator of the present invention preferably is located in the lateral wall of the housing, or water shield. Preferably, the housing wall will be vertical. The walls of prior art housings typically have been frustoconical, as with the screen and flight assembly. Use of a vertical wall facilitates the opening and closing of the access door. Also, a vertical walled housing tends to last longer. When the housing wall is vertical, the distance between it and the flights is greater than when the wall is frustoconical. As a result, the solids that pass through the screen strike the housing with less velocity. This results in less abrasion and longer wear of the housing.

When a vertical wall housing is used, it is preferred that adjacent access doors be located both in the wall and in the top of the housing, so as to provide one large opening when all of the doors and panels are swung open or removed.

It was feared when constructing the first separator of the present design that it would be difficult to prevent water from leaking around the edges of the access door(s) in the housing, and that expensive sealing means would have to be employed. We have surprisingly found, however, that when the separator is used to dewater coal, any cracks between the door(s) and housing quickly are plugged with fine coal dust, and no substantial leakage occurs after that.

The means of feeding the slurry into vertical centrifugal separators typically include a downward-opening hopper discharge tube mounted coaxially with the rotor. The outer diameter of the tube is slightly smaller than the opening in the top end of the frustoconical screen. The tube enters through a hole in the top of the housing and extends a short way into the opening in the top end of the screen, e.g., to a point about one to two inches below the level of the top of the screen.

In the separator of the present invention it is preferred that the hopper discharge tube be retractable, so that its bottom end can be raised to above the level of the top of the screen, without having to dismantle the tube. Thus, for example, the tube can be a telescoping one.

The invention will be better understood by considering the drawings accompanying this specification, a description of which now follows.

Figure 1:
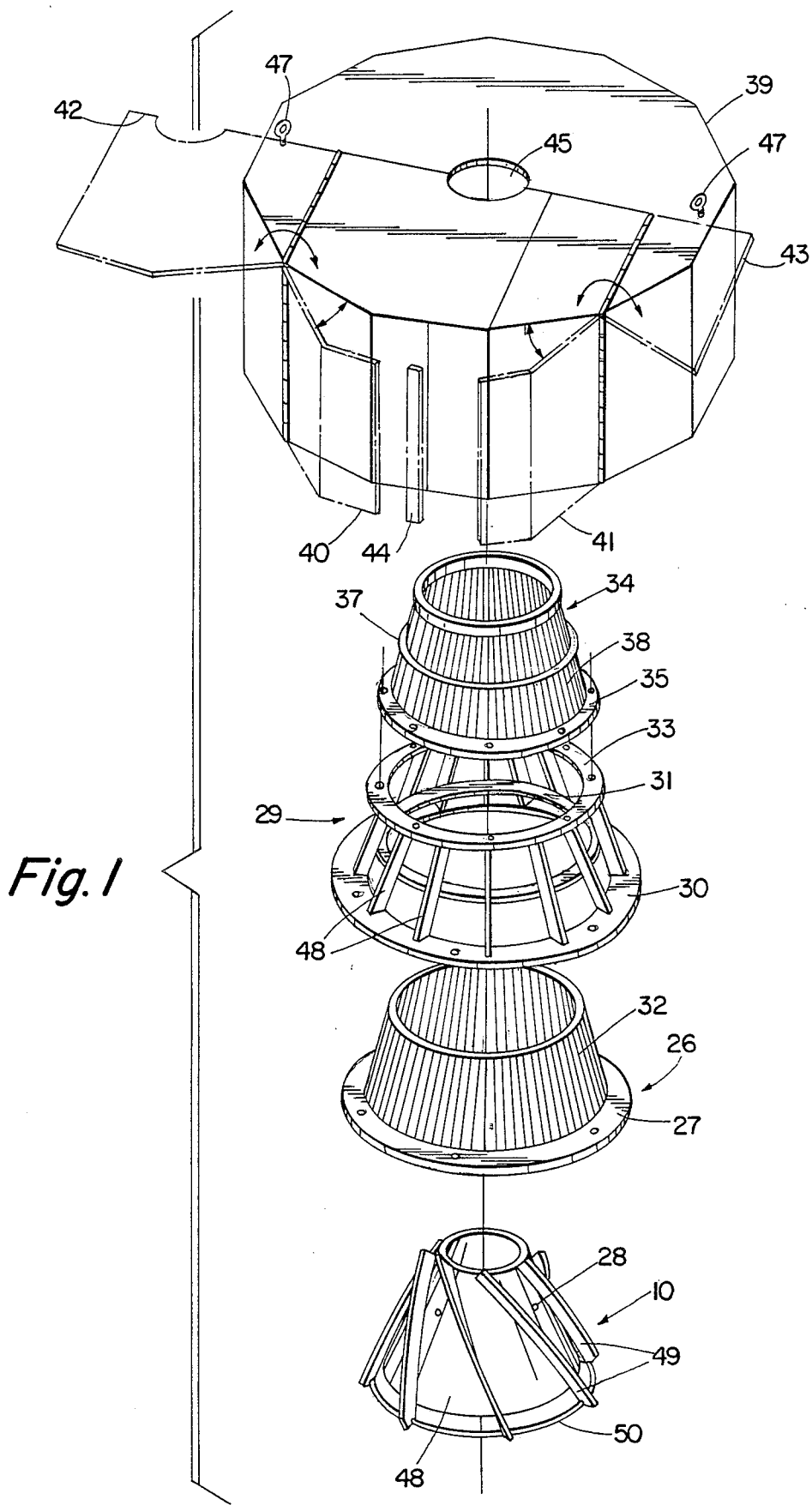
FIG. 1 is an exploded, isometric view of a separator embodying the present invention, from the flight assembly out to the water shield.
Figure 2:
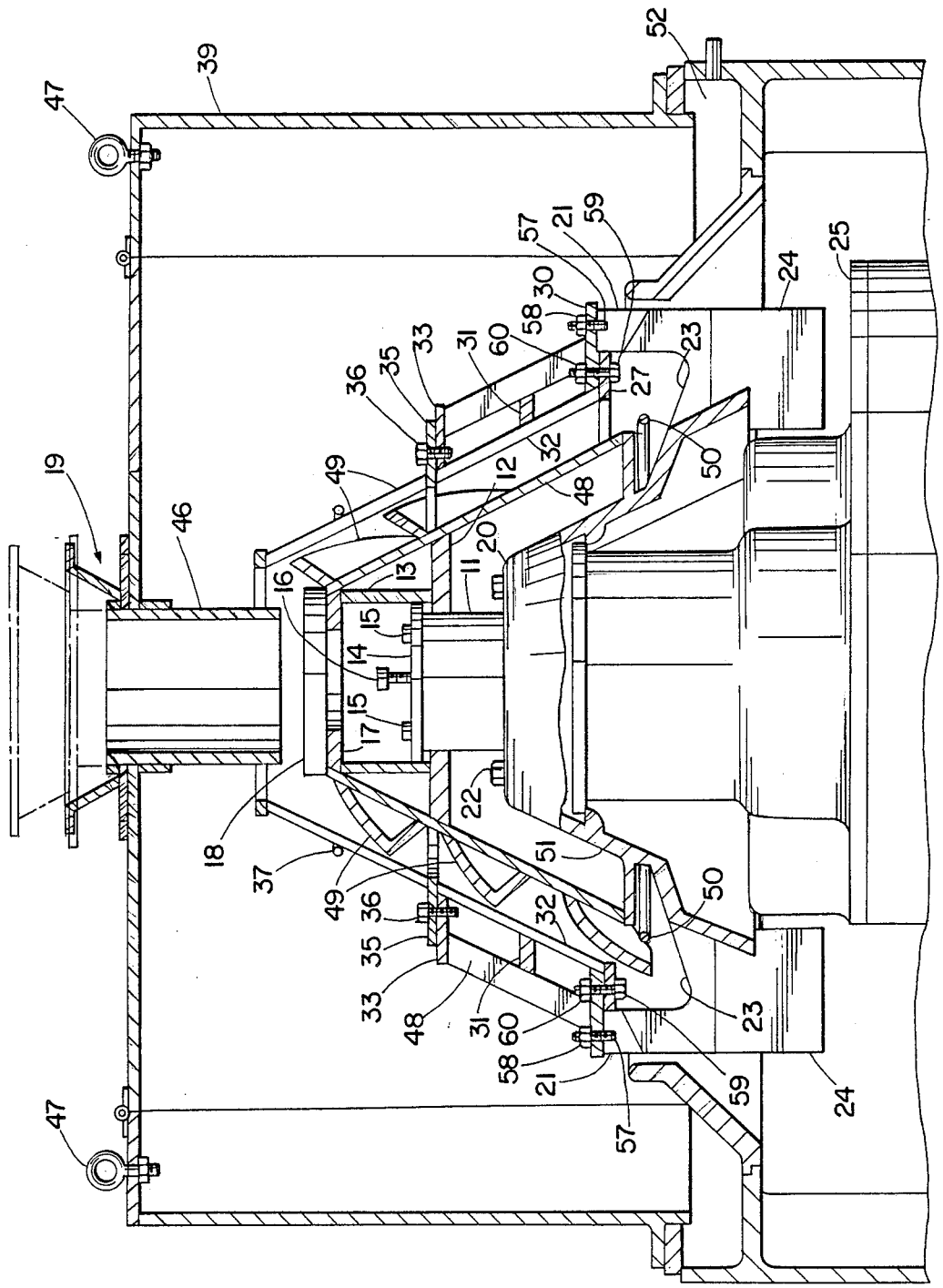
FIG. 2 is an enlarged, cross-sectional front view of the separator of FIG. 1 in its assembled state, which also includes a depiction of portions of the drive mechanism and the support structure for the apparatus.

Referring to FIGS. 1 and 2, conical flight assembly 10 is carried by inner drive shaft 11. Flight assembly 10 comprises a hollow frustrum of a right circular cone 48, eight flights 49 mounted thereon, and a stabilizing ring 50 (shown in FIG. 1, not in FIG. 2). The means of attachment oomprises a horizontal ring 12, to which flight assembly 10 is held by bolts (not shown) that pass through mounting holes 28. Ring 12 is welded to the underside of collar 13, which has a lower horizontal plate 14 welded to its inner wall. Plate 14 is fastened to the upper end of drive shaft 11 by bolts 15. Set screw 16 allows the distance between plate 14 and the upper end of shaft 11 to be adjusted.

Welded to the top of collar 13 is an upper horizontal plate 17, which has a large center opening to permit access to bolts 15 and 16. A removable cover 18 is held to upper plate 17 by bolts (not shown). Cover 18 seals the access hole in plate 17 so as to prevent incoming slurry from charging hopper 19 from contacting (and damaging) bolts 15 and 16.

Surrounding inner drive shaft 11 is a concentric outer drive shaft, which is obscured in FIG. 2 by the hub 20 of a spoked rotor wheel 49. Hub 20 of the rotor 49 is fastened to the outer drive shaft by bolts 22. Spokes 23 connect hub 20 to outer rim 21 of the rotor. Plow blades 24 depend from spokes 23, their purpose being to sweep fallen solids (not shown) from off the top of drive mechanism housing 25.

Mounted atop rotor rim 21 is support basket 29, which braces lower partial screen 26. The bottom flange 30 of basket 29 coincides with, and sits directly upon, rotor rim 21. Flange 30 is held to rim 21 by threaded studs 57 and nuts 58. Flange 27 of bottom partial screen 26 is held to the underside of the bottom flange 30 of basket 29 by bolts 59 and nuts 60. Inner ring 31 of support basket 29, which is welded to strut members 48, bears against the vertical rods 32 of lower partial screen 26.

Figure 3:
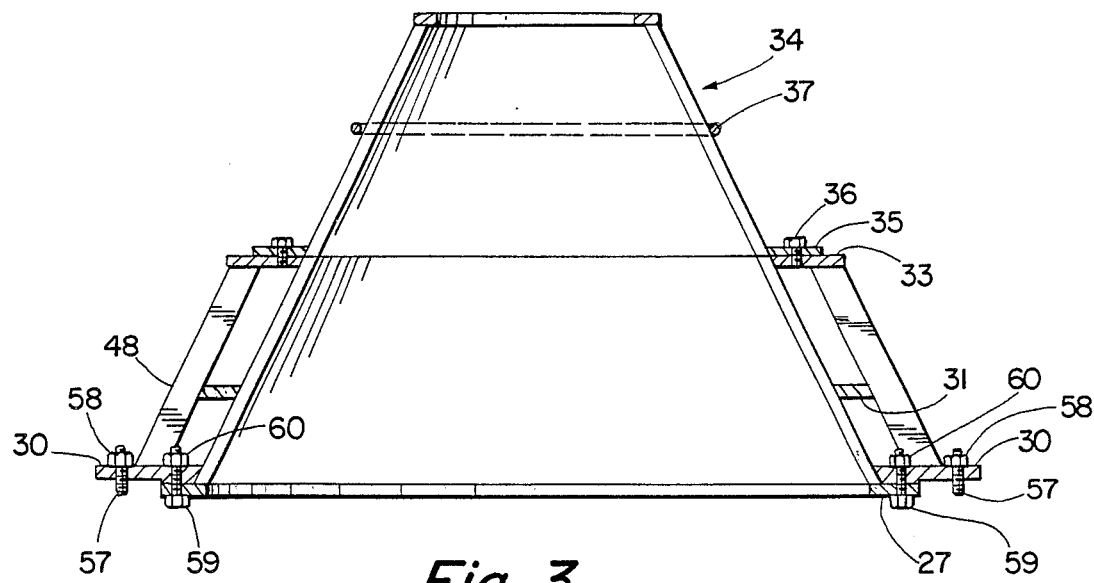
FIG. 3 is a front, cross-sectional view of just the screen and the support basket of the separator as depicted in FIG. 2, drawn to the same scale as FIG. 2.

At the upper end of support basket 29 is a top flange 33. Mounted atop flange 33 is upper partial screen 34. Bottom flange 35 of screen 34 is attached by bolts 36 to basket flange 33. Upper partial screen 34 has an outer horizontal hoop 37 that is welded to the vertical rods 38 to brace the screen. As seen in FIG. 3, screens 26 and 34 abut in a smooth joint, so as to create a screening surface that is a substantially unbroken plane from the top of upper partial screen 34 to the base of lower partial screen 26.

Surrounding the flight support assembly 10, lower screen 26, upper screen 34, and support basket 29, when assembled as shown in FIG. 1, is water shield 39. The vertical wall of shield 39 is divided into 12 flat, rectangular panels. This design facilitates the lining of the shield with flat ceramic tiles (not shown), A tile lining is often desired in order to increase the shield's resistance against the erosive forces of the water and entrained small solids that are hurled outwardly through screens 26 and 34.

Figure 4:
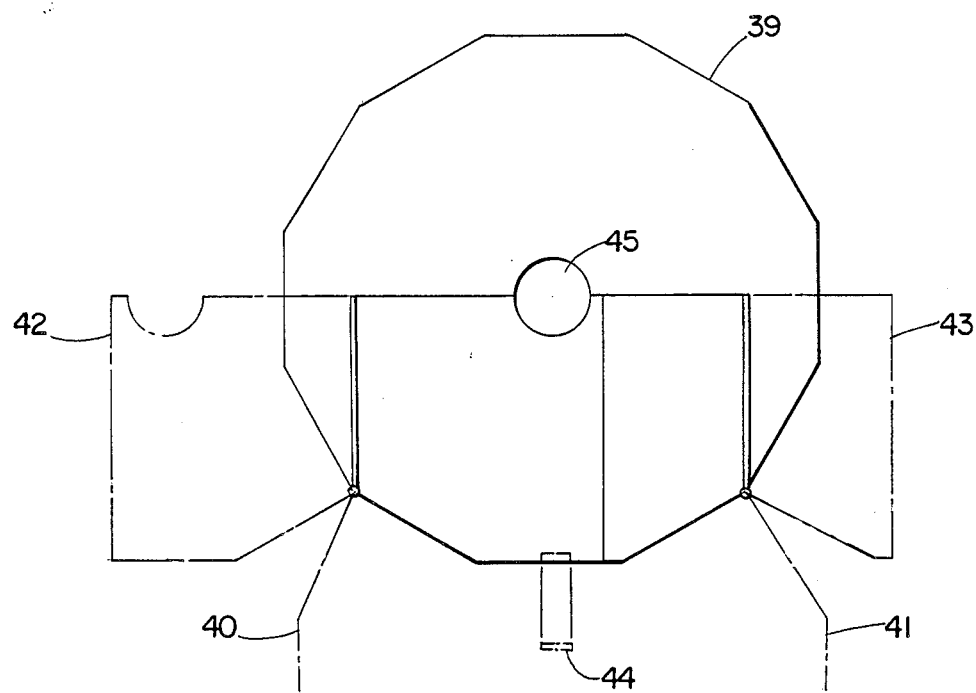
FIG. 4 is a top view of just the water shield of the separator shown in FIGS. 1 and 2, drawn to approximately the same scale as FIG. 1.

As seen in FIGS. 1, 2, and 4, water shield 39 has a pair of doors 40 and 41 in its lateral wall, as well as a pair of hinged panels 42 and 43 in its top surface. Doors 40 and 41 seat against removable post 44 when closed; they are held shut by a conventional latching mechanism (not shown). Top panels 42 and 43, when closed, rest on the top edges of doors 41 and 42 when closed. Centrally located in the top surface of water shield 39 is an access hole 45 for the discharge tube 46 of charging hopper 19. Eye bolts 47, attached to the top surface of water shield 39, permit the shield to be lifted by a hoist (not shown).

To use the vertical centrifugal separator to dry coal, inner drive shaft 11 and the outer drive shaft to which rotor 51 is attached are both rotated at high speeds in a counterclockwise direction (referring to the orientation seen in FIG. 1). Shaft 11 is rotated at a slightly higher speed, e.g., about 667 rpm versus 658 rpm for rotor 51, so that screens 26 and 34 constantly glide by the flights 49 of conical flight assembly 10. The coal slurry (not shown in the drawings) is poured through hopper 19 into the annular space between screens 26 and 34 and the cone 48 on which flights 49 are mounted. The slurry is caught and propelled around the annular space by flights 49. Water and small suspended solids (not shown in the drawings) fly radially through the spaces between rods 32 and 38, through the openings in basket 29, strike the inside wall of water shield 39, and fall into collection trough 52, known as a "launder." The water and suspended solids flow out of launder 52 through outlet pipe 53. The dried coal falls out the bottom of the annular space, drops past drive mechanism housing 25, and is collected on a conveyor belt (not shown) that passes below the separator. Coal that collects on top of housing 25 is swept off by the revolution of plow members 24 that depend from, and are integral with, spokes 23 of rotor 51.

Figure 5:
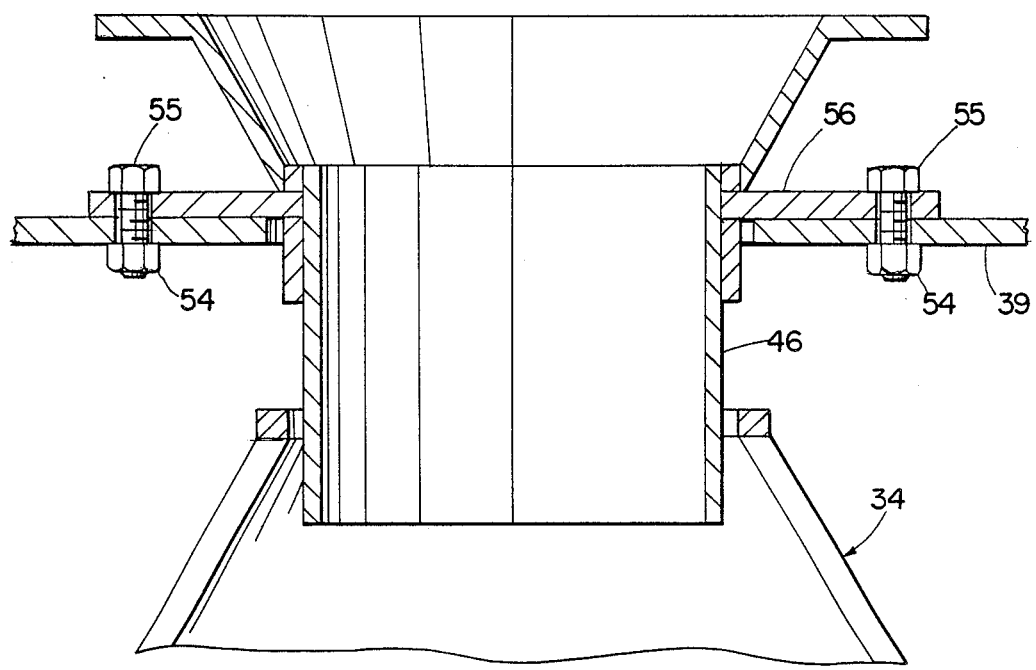
FIG. 5 is an enlarged, cross-sectional view of the charging hopper of the separator shown in FIG. 2.
Figure 6:
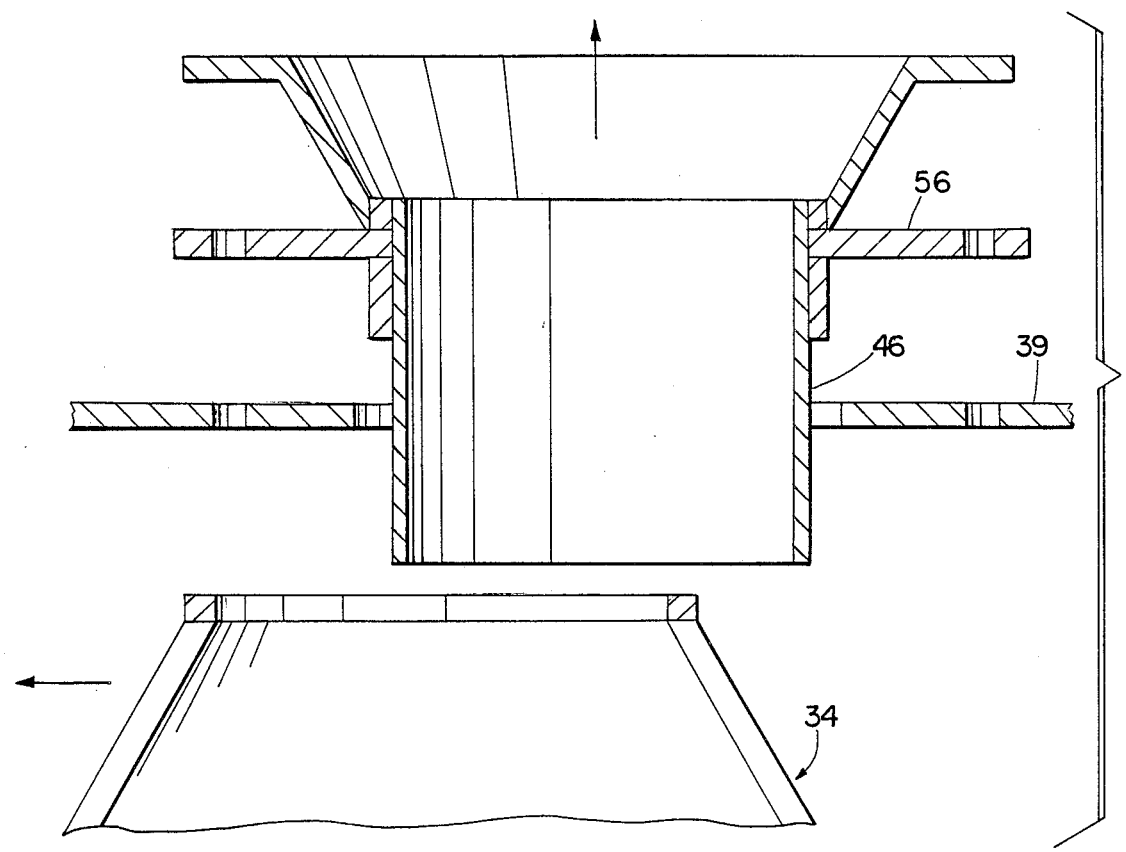
FIG. 6 shows the charging hopper of FIG. 5 when disconnected and being raised to allow the removal and replacement of the upper partial screen of the separator.

As discussed above, we have observed that most of the wear of the screen in centrifugal separators of this general type tends to occur in the upper 30 to 40 percent of the screen height. The machine design shown in the drawings permits the replacement of just the upper partial screen in as little time as about 30 minutes. With prior art designs that also require the removal and replacement of the water shield and the support basket, the screen changing operation takes about two to three hours. Referring to FIGS. 5 and 6 of the drawings accompanying this specification, it is seen that in the upper partial screen replacement operation, nuts 54 and bolts 55 that hold flange 56 of charging hopper 19 to the top surface of water shield 39 are removed. Hopper 19 then is lifted clear of the top of upper partial screen 34. Doors 40 and 44 are opened, and panels 42 and 43 are laid back. Post 44 is removed. Screen 34 is then disconnected from support basket 29 by the removal of bolts 36. Screen 34 then is lifted off flange 33 of basket 29, tilted sufficiently to clear cover 18, and is removed through the opened doors and panels. A new upper partial screen is installed, water shield 39 is closed up, charging hopper 19 is put back in place, and the separator is ready to be returned to service. All of this is accomplished in perhaps only one-fourth to one-sixth of the downtime required when working with prior art separators.

To provide easier access with a wrench to disconnect flange 56 of hopper 19 from water shield 39, nuts 54 and bolts 55 can be replaced with threaded studs and nuts (not shown), the studs protruding upward from water shield 39 and the nuts riding on the upper surface of flange 56.

We claim:

1. In a vertical centrifugal separator comprised of a vertical drive shaft assembly; a frustoconical flight assembly coaxially carried by said drive shaft assembly so that the base of the frustrum is down and the top of the frustrum is up, said flight assembly consisting essentially of a hollow frustrum of a right circular cone that has a plurality of parallel, spiral, hindrance flights attached to the exterior of its lateral wall; a frustoconical screen also carried by said drive shaft assembly and mounted in such a position as to concentrically surround said flight assembly; differential means for causing said flight assembly and said screen to spin in the same direction at different speeds; and a housing that encloses said screen; the IMPROVEMENT wherein the screen is in the configuration of a frustrum of a right circular cone and is divided horizontally into an upper partial screen and a lower partial screen, said partial screens being detachably held together, and the housing has an access door through which the upper partial screen can be detached from the lower partial screen and the rotor, removed from the housing, and replaced with a new partial screen, without removing the housing or the lower partial screen.

2. The separator of claim 1 wherein the height of the upper partial screen is about 30 to 70 percent of the height of the entire screen.

3. The separator of claim 1 additionally including a rigid, frustoconical support basket sitting atop said lower partial screen and secured so as to brace, and spin in unison with, said lower partial screen, there being no such support basket atop said upper partial screen, said upper partial screen thereby being removable from said housing without having to also remove said support basket.

4. The separator of claim 2 additionally including a rigid, frustoconical support basket sitting atop said lower partial screen and secured so as to brace, and spin in unison with said lower partial screen, there being no such support basket atop said upper partial screen, said upper partial screen thereby being removable from said housing without having to also remove said support basket.

5. The separator of claim 1 wherein the lateral wall of the housing is substantially vertical.

6. The separator of claim 2 wherein the lateral wall of the housing is substantially vertical.

7. The separator of claim 3 wherein the lateral wall of the housing is substantially vertical.

8. The separator of claim 4 wherein the lateral wall of the housing is substantially vertical.

9. The separator of claim 1 wherein the access door is in the lateral wall of the housing.

10. The separator of claim 4 wherein the access door is in the lateral wall of the housing.

11. The separator of claim 8 wherein at least one access door is in the lateral wall of the housing and an adjacent access panel is located in the top of the housing.

12. The separator of claim 5 wherein the lateral wall of the housing is comprised of flat, rectangular panels.

13. The separator of claim 11 wherein the lateral wall of the housing is comprised of flat, rectangular panels.

14. The separator of claim 3 wherein the upper partial screen has an external horizontal flange at or near its base that sits on a corresponding external flange of the support basket located at or near the top of the basket, said separator including means for holding said flanges together.

15. The separator of claim 14 wherein the separator includes a spoked rotor wheel carried and driven by the drive shaft assembly, said wheel being horizontally disposed and including a rim; the lower partial screen has an external horizontal flange; the support basket has an external horizontal flange; and said rim and flanges are all fastened together.

16. The separator of claim 8 wherein the upper partial screen has an external horizontal flange at or near its base that sits on a corresponding external flange of the support basket located at or near the top of the basket, said separator including means for holding said flanges together, and said upper and lower partial screens abut one another to form a substantially planar screening surface that extends from about the top of the upper screen to about the base of the lower screen.

17. The separator of claim 16 wherein the separator includes a spoked rotor wheel carried and driven by the drive shaft assembly, said wheel being horizontally disposed and including a rim; the lower partial screen has an external horizontal flange; the support basket has an external horizontal flange; and said rim and flanges are all fastened together.

18. The separator of claim 11 wherein the upper partial screen has an external horizontal flange at or near its base that sits on a corresponding external flange of the support basket located at or near the top of the basket, said separator including means for holding said flanges together, and said upper and lower partial screens abut to form a substantially planar screening surface that extends from about the top of the upper screen to about the base of the lower screen.

19. The separator of claim 13 wherein the upper partial screen has an external horizontal flange at or near its base that sits on a corresponding external flange of the support basket located at or near the top of the basket, said separator including means for holding said flanges together, and said upper and lower partial screens abut to form a substantially planar screening surface that extends from about the top of the upper screen to about the base of the lower screen.

20. The separator of claim 19 wherein the separator includes a spoked rotor wheel carried and driven by the drive shaft assembly, said wheel being horizontally disposed and including a rim; the lower partial screen has an external horizontal flange; the support basket has an external horizontal flange; and said rim and flanges are all fastened together.

21. The separator of claim 1 additionally including a retractable, downward-opening, hopper discharge tube mounted coaxially with the drive shaft assembly, the bottom end of the tube, when fully extended, being located below the level of the top end of the screen, and said tube being sufficiently retractable that its bottom end can be raised to above the level of the top end of the screen without dismantling the tube.

22. The separator of claim 3 additionally including a retractable, downward-opening, hopper discharge tube mounted coaxially with the drive shaft assembly, the bottom end of the tube, when fully extended, being located below the level of the top end of the screen, and said tube being sufficiently retractable that its bottom end can be raised to above the level of the top end of the screen without dismantling the tube.

23. The separator of claim 8 additionally including a retractable, downward-opening, hopper discharge tube mounted coaxially with the drive shaft assembly, the bottom end of the tube, when fully extended, being below the level of the top end of the screen, and said tube being sufficiently retractable that its bottom end can be raised to above the level of the top end of the screen without dismantling the tube.

24. The separator of claim 16 additionally including a retractable, downward-opening, hopper discharge tube mounted coaxially with the drive shaft assembly, the bottom end of the tube, when fully extended, being below the level of the top end of the screen, and said tube being sufficiently retractable that its bottom end can be raised to above the level of the top end of the screen without dismantling the tube.

25. The separator of claim 17 additionally including a retractable, downward-opening, hopper discharge tube mounted coaxially with the drive shaft assembly, the bottom end of the tube, when fully extended, being below the level of the top end of the screen, and said tube being sufficiently retractable that its bottom end can be raised to above the level of the top end of the screen without dismantling the tube.

26. The separator of claim 18 additionally including a retractable, downward-opening, hopper discharge tube mounted coaxially with the drive shaft assembly, the bottom end of the tube, when fully extended, being below the level of the top end of the screen, and said tube being sufficiently retractable that its bottom end can be raised to above the level of the top end of the screen without dismantling the tube.

27. The separator of claim 20 additionally including a retractable, downward-opening, hopper discharge tube mounted coaxially with the drive shaft assembly, the bottom end of the tube, when fully extended, being below the level of the top end of the screen, and said tube being sufficiently retractable that its bottom end can be raised to above the level of the top end of the screen without dismantling the tube.

28. The separator of any of claims 12, 13, or 19, wherein the lateral wall of the housing is lined with flat ceramic tiles.

29. The separator of either of claims 20 or 27, wherein the lateral wall of the housing is lined with flat ceramic tiles.

* * * * *